United States Patent
Dudley et al.

(10) Patent No.: US 6,287,041 B1
(45) Date of Patent: Sep. 11, 2001

(54) DOOR EDGE ATTACHMENT ADAPTER

(75) Inventors: Francis Dudley; Douglas F. Walker, both of Long Beach, CA (US)

(73) Assignee: News America FSI, Inc., New York, NY (US)

( * ) Notice: Subject to any disclaimer, the term of this patent is extended or adjusted under 35 U.S.C. 154(b) by 0 days.

(21) Appl. No.: 08/802,128

(22) Filed: Feb. 19, 1997

(51) Int. Cl.$^7$ .................................................. G09F 3/20
(52) U.S. Cl. .................... 403/256; 40/658; 248/226.11
(58) Field of Search .................................. 403/234, 235, 403/237, 256, 373, 374.3, 374.4; 40/651, 658; 248/205.1, 226.11

(56) References Cited

U.S. PATENT DOCUMENTS

| | | |
|---|---|---|
| D. 275,074 | 8/1984 | Villanueva . |
| D. 275,177 | 8/1984 | Villanueva . |
| D. 278,679 | 5/1985 | Villanueva . |
| D. 286,113 | 10/1986 | Albery . |
| D. 302,704 | 8/1989 | Krautsack . |
| D. 306,541 | 3/1990 | Krautsack . |
| 1,712,423 * | 5/1929 | Devins ................................. 40/658 |
| 1,728,789 * | 9/1929 | Devins ................................. 40/658 |
| 2,529,686 * | 11/1950 | Green ................................. 280/502 |
| 2,552,685 * | 5/1951 | McCarthy ........................... 40/651 |
| 2,787,433 * | 4/1957 | Slavsky et al. ................. 248/231.71 |
| 2,982,508 * | 5/1961 | Larsen et al. ..................... 248/205.1 |
| 3,015,897 * | 1/1962 | Hopp ................................. 40/651 X |
| 3,084,463 * | 4/1963 | Guyer et al. ....................... 40/658 X |
| 4,307,900 | 12/1981 | Krautsack . |
| 4,805,331 * | 2/1989 | Boggess et al. ..................... 40/651 |
| 5,083,765 | 1/1992 | Kringel . |
| 5,207,349 | 5/1993 | Kringel . |
| 5,237,767 * | 8/1993 | Kringel et al. ...................... 40/658 |
| 5,289,652 | 3/1994 | Kringel et al. . |
| 5,344,250 | 9/1994 | Kringel et al. . |
| 5,472,289 | 12/1995 | Kringel et al. . |
| 5,857,477 * | 1/1999 | James ............................ 248/226.11 |

FOREIGN PATENT DOCUMENTS

| | | |
|---|---|---|
| 655776 | 11/1990 | (AU) . |
| 1296892 | 3/1992 | (CA) . |
| 2085130 | 5/1998 | (CA) . |

OTHER PUBLICATIONS

Poptimes, Dec. 1999, "Southern Imperial, Inc.", pp. 27, vol. 12, No. 12, Hoyt Publishing Company, Skokie, IL, USA.

* cited by examiner

Primary Examiner—Anthony Knight
Assistant Examiner—David E. Bochna
(74) Attorney, Agent, or Firm—Weil, Gotshal & Manges LLP

(57) ABSTRACT

An adapter for attaching to the edge of a door, such as a freezer door, to permit coupon dispensers, display devices and the like to be mounted to the edge of the door. The adapter is held in place with a clamp that bears against the door handle. The adapter includes a mounting plate perpendicular to the door so that a coupon dispenser or other display device can be mounted substantially parallel to the door. The mounting plate includes a portion of a price rail so that the same coupon dispensers and mounting brackets used with grocery shelves may also be used with the present invention. The price rail may be a separate piece that is welded to the mounting plate or formed from the same piece of material as the mounting plate.

7 Claims, 4 Drawing Sheets

DOOR EDGE ATTACHMENT ADAPTER

BACKGROUND OF THE INVENTION

This invention relates to an adapter for the edge of a door. More particularly, the invention relates to an adapter for attaching a display and/or dispensing device to the edge of a door.

Point of sale promotional advertisements are becoming more prevalent, particularly in supermarkets and grocery stores. Many advertisers now place promotional material on grocery shelves in the vicinity of their products in order to draw shoppers' attention to their products. One method of advertising that has become very popular over the last 10 years or so is to distribute coupons to shoppers by providing coupon dispensers that attach directly to grocery shelves. U.S. Pat. Nos. 5,083,765 and 5,207,349 disclose coupon dispensers intended for this purpose. Other coupon dispensers are also available, such as those manufactured for the assignee of the present invention.

Retailers that agree to allow such dispensers to be attached to their grocery shelves generally require that they be low maintenance, durable, and easy to use. In addition, it is important to provide a means for attaching such dispensers that allows for simple attachment and removal as the dispensers typically are moved from one shelf to another. Furthermore, it is also important that the dispensers are securely mounted to prevent tampering and theft.

To achieve these goals, several mounting arrangements for attaching coupon dispensers and other display devices to grocery shelves have been developed. These mounting arrangements utilize the rail attached to the edge of grocery shelves where price tags are placed to identify the items on the shelf, commonly referred to as the "price rail." The price rail is an obvious place to mount coupon dispensers and other display devices as it is generally available on all grocery shelves. U.S. Pat. Nos. 5,289,652, 5,344,250, and 5,472,289 disclose a mounting device specifically designed to mount promotional displays, dispensers and the like to the price rail of a grocery shelf.

The use of coupon dispensers is growing rapidly as these devices have proven to be highly successful advertising mechanisms. Coupons dispensed from such dispensers have a much higher redemption rate than coupons distributed through standard channels such as newspaper inserts.

As the use of such dispensers has become widespread, manufacturers have expressed a desire to use them for other items besides those sold on grocery shelves. For example, manufacturers of refrigerated and frozen food products are also using such dispensers to increase sales of their products. Such cases include glass doors so that shoppers can see the products inside. A problem arises, however, when such dispensers are used for items sold in refrigerated and freezer cases. These cases do not allow for easy mounting of coupon dispensers. First, some cases do not include the price rails found on the grocery shelves. Second, because the dispensers are designed to protrude out from the shelf for visibility, there is not sufficient space to mount the dispenser. Third, the coupon dispensers may not be designed for continuous exposure to the extremely low temperatures of a freezer case.

There is thus a need for an improved means for mounting coupon dispensers and other display devices to refrigerated and freezer cases.

There is also a need for a mounting scheme for mounting coupon dispensers and other display devices to refrigerated and freezer cases that allows for use of existing dispensers and mounting brackets.

There is also a need for a mounting scheme for mounting coupon dispensers and other display devices to refrigerated and freezer cases that provides a theft and tamper proof attachment.

There is also a need for a mounting scheme for easy and low cost mounting of coupon dispensers and other display devices to refrigerated and freezer cases.

SUMMARY OF THE INVENTION

These and other objects are achieved by the door edge mounting adapter of the present invention. The adapter of the present invention is an inexpensive device that attaches to the edge of, for example, a freezer door, and is secured to the handle of the door with a clamp. The adapter includes a mounting plate perpendicular to the door so that a coupon dispenser or other display device can be mounted parallel to the door. The mounting plate includes a portion of a price rail so that the same coupon dispensers and mounting brackets used with grocery shelves may also be used with the present invention. Thus, the adapter of the present invention provides a low cost, easy to use means for mounting coupon dispensers and other display devices to refrigerated and freezer case doors and provides for full interchangeability with the coupon dispensers and mounting brackets of dispensers used with grocery shelves.

The invention also comprises a method for mounting a display or dispensing device to the edge of a door having a handle which comprises providing a bracket with two arms extending around the door edge and spaced apart to permit the door handle to protrude from the door edge between said arms, wherein the arms protrude from a mounting plate for mounting the display or dispensing device, providing a clamp attached to the bracket and slidably movable in relation thereto in a direction substantially perpendicular to the mounting plate, biasing the clamp against the door handle to maintain the bracket in place on the door edge, and mounting a display or dispensing device to the mounting plate.

BRIEF DESCRIPTION OF THE DRAWINGS

The foregoing summary, as well as the following detailed description of a preferred embodiment, is better understood when read in conjunction with the drawings appended hereto. For purposes of illustrating the invention, there is shown in the drawings a presently preferred embodiment, it being understood, however, that the invention is not limited to the specific instrumentalities and components disclosed herein.

FIG. 2 is an isometric view of one embodiment of a clamp used with the adapter of the present invention.

FIG. 4 is a schematic view illustrating the use of the adapter of the present invention with doors of different thicknesses.

DETAILED DESCRIPTION OF THE INVENTION

The adapter of the present invention is an inexpensive device that attaches to the edge of, for example, a freezer door, and is secured to the handle of the door with a clamp. The adapter includes a mounting plate perpendicular to the door so that a coupon dispenser or other display device can be mounted parallel to the door. The mounting plate includes a portion of a price rail so that the same coupon dispensers and mounting brackets used with grocery shelves may also be used with the present invention. The price rail may be a separate piece that is welded to the mounting plate. In a preferred embodiment, however, the price rail is formed from the same piece as the mounting plate.

Figure 1:
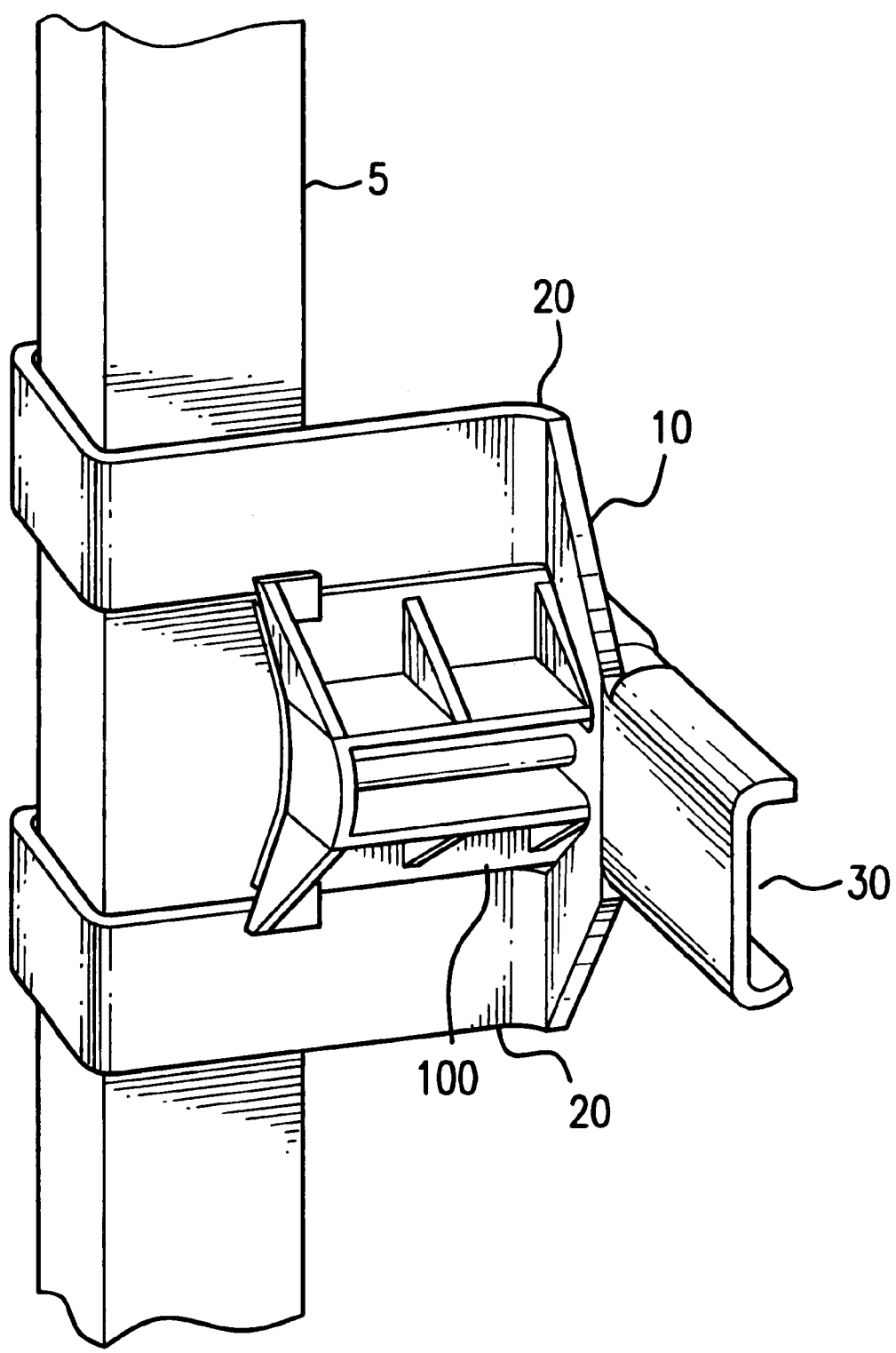
FIG. 1 is an isometric view of one embodiment of the door attachment adapter of the present invention.

FIG. 1 is an isometric view of a preferred embodiment of the adapter of the present invention, shown attached to the edge of a freezer door 5 on the outside of the door. Bracket 10 is shaped to fit around the edge of the door near the handle that is attached to the edge of the door. Clamp 100 is slidably mounted to bracket 10 and is used to hold the bracket 10 against the door handle.

Bracket 10 includes two L-shaped arms 20 that wrap around the edge of the door. The arms are spaced apart so as to straddle the door handle mounted to the edge of the freezer door (not shown) when the adapter is in use. The L-shaped arms protrude perpendicularly from mounting plate 30. In a preferred embodiment, bracket 10 is formed by bending a single piece of 0.10 inch thick 304 stainless steel. The function of plate 130 is to provide a mounting surface for the coupon dispenser or other advertising/display device to be mounted to the door. The reverse side of plate 30 is shown in FIG. 3, discussed below.

Figure 2A:
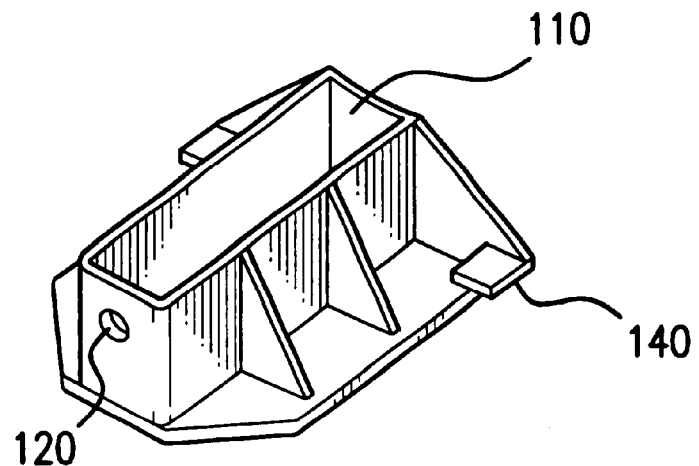
FIG. 2a is a rear isometric view.
Figure 2B:
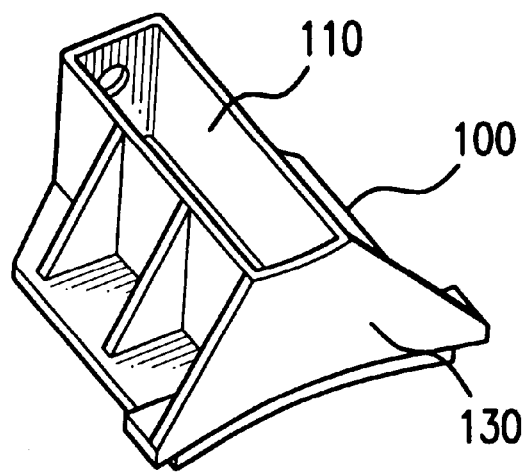
FIG. 2b is a front isometric view of one embodiment of a clamp used with the adapter of the present invention.

FIG. 2 is a detail view of one embodiment of clamp 100, which may be fabricated inexpensively from injection molded plastic. FIG. 2(a) is a rear isometric view and FIG. 2(b) a front isometric view of the clamp 100. The clamp includes a channel 110 into which tab 40 (discussed below in connection with FIG. 3) of bracket 10 protrudes to provide sliding engagement between the clamp and the bracket when the two are assembled. Clamp 100 also includes a through hole 120 that aligns with threaded hole 50 in tab 40 upon assembly. Front surface 130 is slightly curved to accommodate different sized door handles. The clamp includes tabs 140 on each side that engage the arms 20 of bracket 10 when the clamp and bracket are mated. The tabs help to guide the clamp as it is moved along the bracket.

Figure 3:
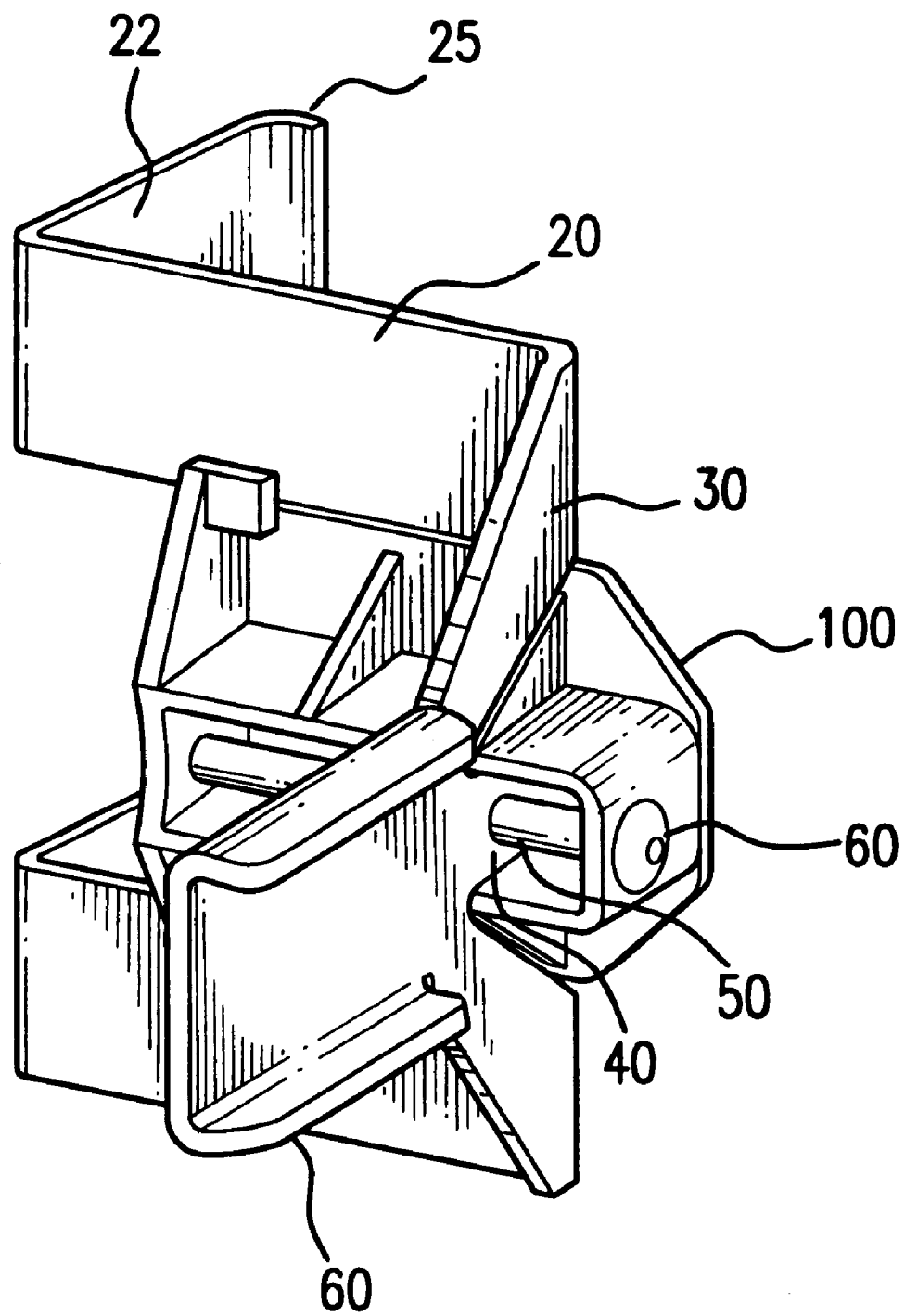
FIG. 3 is an isometric view of an alternate embodiment of the door attachment adapter of the present invention.
Figure 4A:
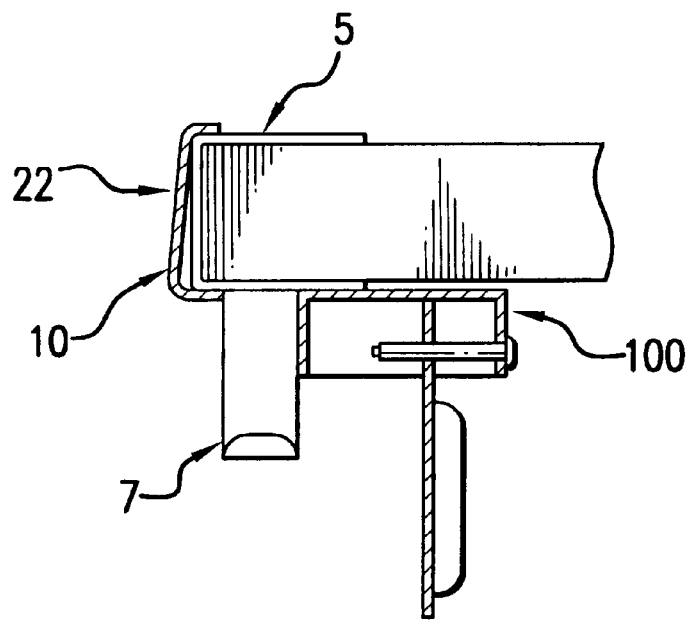
FIGS. 4a and 4b are schematic views illustrating the use of the adapter of the present invention with doors of different thicknesses.
Figure 4B:
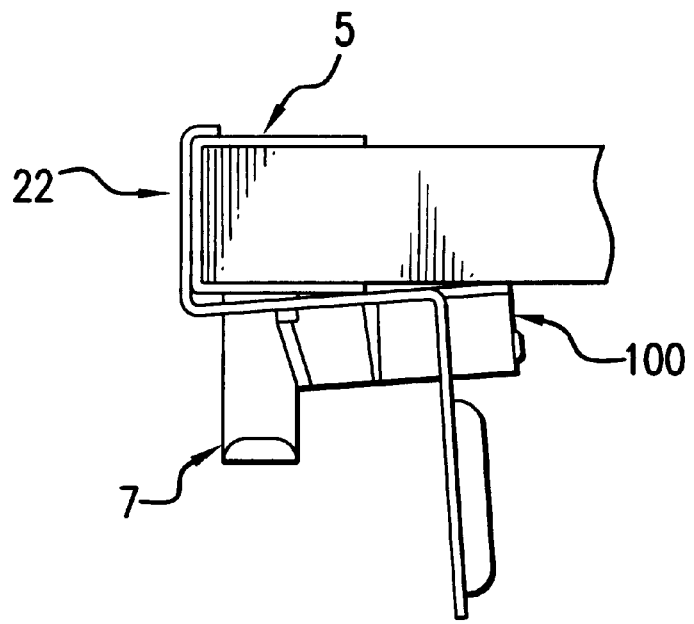

As shown in FIG. 3, mounting plate 30 is bent to the shape of a price rail 60 so as to mount a dispenser or other display device without the need for any additional mounting hardware. In an alternate embodiment, a separate piece of price rail channel may be welded to plate 30. Each arm includes a small lip 25 that engages the rear edge of the door. Each arm also includes a portion 22 that is bent inward slightly (i.e., toward the mounting plate 30) to accommodate doors with different depths or thicknesses. For example, if the thickness of the door is greater than the length of portions 22 of the arms 20 as shown schematically in FIG. 4(a), the clamping force of the arms will be applied on the inner corner of the door edge, near the lip 25 and where the clamp 100 contacts the door handle 7. The large arrows indicate the clamping forces. For thinner doors, arms 20 will rotate about the inner corner of the door so that the door edge will be flush against the portions 22. Due to the slight inward bend in the arms 20, the mounting plate 30 will be rotated slightly as well, as shown in FIG. 4(b), so that the bracket will no longer rest flush against the front of the door edge. Thus, in this case as well, the clamping force will be applied at the inner corner of the door.

Plate 30 includes a tab 40 adapted fit within the channel 110 of clamp 100 to provide sliding engagement between the clamp and bracket as shown in FIG. 3. Tab 40 also includes a threaded through hole 50 for receiving a screw or bolt 160. As shown in FIG. 3, screw 160 is used to attach the clamp 100 to the bracket 10 and protrudes through hole 120 in clamp 100. When the screw is turned clockwise, the clamp is moved away from plate 30 in a perpendicular direction until it bears against the door handle so as to secure the bracket 10 in place. Tabs 140 of the clamp slide along the edges of arms 20 as the clamp moves. The clamp exerts a force in the opposite direction on the bracket 10 which causes the bracket to remain firmly mounted to the edge of the door.

The invention has been described in greatest detail with respect to the particular embodiments and exemplary applications described above. It is understood by those of ordinary skill in the art that changes may be made to the embodiments described herein without departing from the broad inventive concepts thereof. The invention is not limited by this embodiment and examples, but is limited only by the scope of the appended claims. For example, the adapter may be used with other types of doors and advertising or promotional devices/displays.

What is claimed is:

1. An adapter for mounting a display or dispensing device to the edge of a door with a handle extending outwardly from said edge, the adapter comprising:

a bracket with two arms spaced apart to permit said door handle to be placed therebetween and generally L-shaped to engage said door edge, said arms extending in a generally perpendicular direction from a mounting plate, said mounting plate including a tab and a surface for mounting said display or dispensing device;

a clamp slidably mounted to said bracket and including a channel shaped to engage said tab for guiding movement of said clamp in a direction substantially perpendicular to said mounting plate; and a fastener for holding said clamp to said bracket and allowing said clamp to bear against said door handle upon installation of said adapter to said door edge;

wherein said tab includes a threaded hole said clamp includes a through hole aligned with said threaded hole, and said fastener comprises a screw.

2. An adapter for mounting a display or dispensing device to the edge of a door with a handle extending outwardly from said edge, the adapter comprising:

a bracket with two arms spaced apart to permit said door handle to be placed therebetween and generally L-shaped to engage said door edge, said arms extending in a generally perpendicular direction from a mounting plate, said mounting plate including a tab and a surface for mounting said display or dispensing device;

a clamp slidably mounted to said bracket and including a channel shaped to engage said tab for guiding movement of said clamp in a direction substantially perpendicular to said mounting plate; and a fastener for biasing said clamp against said door handle; said clamp including a front surface for mating with said door handle, said front surface being laterally offset from said arms, whereby said adapter rotates to accommodate the thickness of said door upon a biasing of said clamp against said door handle.

3. The adapter of claim 2, wherein said bracket further comprises a lip.

4. The adapter of claim 2, wherein said mounting surface includes a portion of a price rail.

5. The adapter of claim 2 wherein said bracket and said mounting surface are formed from a single piece of material.

6. The adapter of claim 2 wherein said bracket includes a tab for engaging said clamp means.

7. The adapter of claim 2 wherein said fastener comprises a screw engaged in a threaded hole in said bracket.

* * * * *